3,534,061
N-[α-(p-METHOXYPHENYL)-β-NITROSTYRYL]-PHENOXYALKYL PYRROLES

Martin L. Black, Ann Arbor, Mich., assignor to Parke, Davis & Company, Detroit, Mich., a corporation of Michigan
No Drawing. Filed Dec. 4, 1967, Ser. No. 687,456
Int. Cl. C07d 27/24, 27/26
U.S. Cl. 260—326.5                                3 Claims

ABSTRACT OF THE DISCLOSURE

N · [α - (p-methoxyphenyl) - β - nitrostyryl]phenoxyalkyl derivatives of various heterocyclic amines such as pyrrole, substituted pyrroles, imidazole, benzimidazole, and N-(2-pyridyl)aniline. The products have pharmacological activity and can be produced by (a) reacting an omega-haloalkoxy compound with a heterocyclic amine in the presence of a base to form the heterocyclic aminoalkoxy group, or (b) reacting a triarylethanol compound or a triarylethylene compound with nitric acid to introduce the nitro group.

SUMMARY AND DETAILED DESCRIPTION

The present invention relates to new organic nitro compounds. More particularly, it relates to new α-(p-methoxyphenyl)-β-nitrostyryl phenoxyalkyl derivatives of heterocyclic amines and to methods for their production.

In the forms of their free bases, the compounds of the invention can be represented by the structural formula

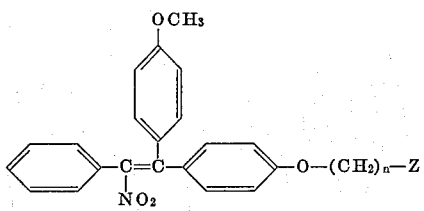

In this formula, Z represents pyrrolyl, methylpyrrolyl, dimethylpyrrolyl, lower alkoxycarbonylpyrrolyl, imidazolyl, benzimidazolyl, or N-(2-pyridyl)anilino; and $n$ is a positive integer from 2 to 4 inclusive.

In accordance with the invention, the foregoing compounds can be produced by reacting a halogen compound of the formula

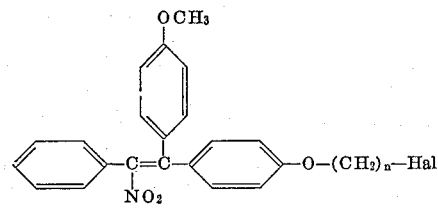

with an amine of the formula

Z—H in the presence of a base, where Z and $n$ are as defined before and Hal represents halogen, preferably bromine or chlorine. Some suitable bases for use in this process are alkali metal hydrides, amides, and alkoxides; and organometallic reagents such as butyllithium and phenyllithium. The preferred base is sodium hydride. Preferred solvents for the reaction are tertiary amides such as dimethylformamide. It is customary to use the reactants in approximately equimolar amounts although a moderate excess of one of the reactants can be used, if desired. The optimal time and temperature of the reaction depend somewhat on the specific reactants but, in general, the reaction is carried out at a temperature of from 0 to 150° C. for from 1 to 70 hours. A preferred temperature range is from 75 to 100° C.

The halogen compounds required as starting materials in the foregoing process can be prepared by any of a variety of methods. For example, a phenoxyalkyl halide is reacted with p-methoxybenzoic acid in the presence of polyphosphoric acid to produce a haloalkoxy benzophenone of the formula

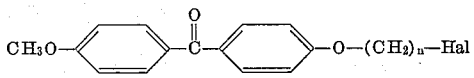

This compound is reacted with benzylmagnesium chloride in tetrahydrofuran solution and the product hydrolyzed to give a 2-phenylethanol compound of the formula

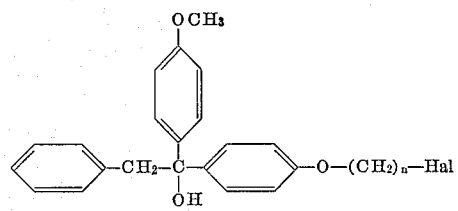

The latter compound is dehydrated by heating with acetic anhydride to give the corresponding stilbene derivative and the product reacted with fuming nitric acid in glacial acetic acid to produce the halogen compound useful as the starting material in the above described process. In these formulas $n$ and Hal are as defined above.

Also in accordance with the invention, the compounds of the invention can be produced by reacting a triarylethanol compound of the formula

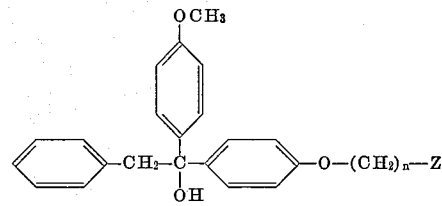

or a triarylethylene compound of the formula

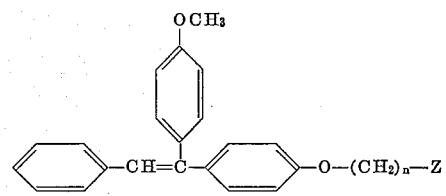

with nitric acid; where Z and $n$ are as defined before. At least one and preferably up to four moles or more of nitric acid are used for each mole of the triarylethanol or triarylethylene compound. In general, the reaction is carried out at a temperature of from 0 to 60° C. for from 20 minutes to 24 hours, the shorter reaction times being used with the higher temperatures. The reaction is preferably carried out using fuming nitric acid at 25–40° C. Some suitable solvents for the reaction are alkanoic acids such as acetic acid or halogenated hydrocarbons such as carbon tetrachloride.

In the foregoing process, it is not critical whether the starting material selected for use is the triarylethanol compound or the triarylethylene compound since the former can be converted into the latter by dehydration during the course of the reaction with nitric acid. For the same reason a mixture of the triarylethanol compound and the triarylethylene compound can be used as a starting material with entirely satisfactory results.

Starting materials required for use in the foregoing process can be prepared by any of a variety of methods.

For example, a phenoxyalkyl halide is reacted with an amine of the formula

Z—H in the presence of sodium hydride in dimethylformamide. The resulting phenoxyalkylamine is reacted with p-methoxybenzoic acid in polyphosphoric acid to produce an aminoalkoxy benzophenone of the formula

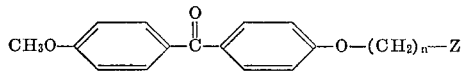

This compound is reacted with benzylmagnesium chloride in tetrahydrofuran solution and the product hydrolyzed to give the triarylethanol compound useful as a start material in the foregoing process. The corresponding triarylethylene compounds are produced by dehydration of the triarylethanol compounds with any of a number of dehydrating agents, such as 85% phosphoric acid for one hour at 90–100° C. or by heating with other mineral acids or with acetic anhydride. In the foregoing formula, Z and $n$ are as defined before.

The compounds of the invention can exist as geometric or cis-trans isomers.

The compounds of the invention are useful pharmacological agents. They exhibit anti-fertility and hypocholesteremic activities. The anti-fertility activity of the compounds of the invention can be measured by testing their effectiveness in preventing pregnancies in mice. The compounds are administered orally by incorporation in the diet at such a concentration that each mouse will receive the preselected daily dosage. The assay procedure is begun by dividing female mice into treatment groups and untreated control groups with four mice housed in each cage. Two days after administration of the drug has begun, a fertile male is introduced into each cage and left there 12 days. A majority of the untreated control group produced litters. The activity of a test compound can be expressed as the minimum daily dose at which no litters are subsequently born to a group of four female mice. In this test 1-[2-[p-[α-(p-methoxyphenyl)-β-nitrostyryl]phenoxy]ethyl]pyrrole and 1-[3-[p-[α-(p - methoxyphenyl) - β - nitrostyryl]phenoxy]-propyl]pyrrole are active at a dose level of 1.0 mg./kg./day. The hypocholesteremic activity of the compounds of the invention is measured by observing their effect on plasma cholesterol levels in rats. Rats weighing 200–250 g. are given daily doses of 25 mg./kg. of a test compound by intubation for one week. Average plasma cholesterol levels are determined at the end of this period and compared with average plasma cholesterol levels of untreated controls. In this test 1-[2-[p[α-(p-methoxyphenyl)-β-nitrostyryl]-phenoxy]ethyl]imidazole produces a 42% reduction in the cholesterol level. The compounds of the invention are active upon oral administration but can also be given by the parenteral route, if desired.

The invention is illustrated by the following examples.

Example 1

Pyrrole, 3.35 g., is added to a mixture consisting of 2.22 g. of a 54% sodium hydride dispersion in mineral oil and 60 ml. of dimethylformamide. The resulting mixture is heated to 50° C. for about 45 minutes or until hydrogen evolution ceases and is then treated with a solution of 22.2 g. of α-[p-(2-bromoethoxy)phenyl]-α′-nitro-4-methoxystilbene in dimethylformamide. The reaction mixture is heated at 100° C. for 6 hours, cooled, and diluted with 100 ml. of benzene and 250 ml. of water. The organic phase is separated and the aqueous phase is extracted four times with 200 ml. portions of benzene. The combined organic phase is washed three times with water, dried over anhydrous magnesium sulfate, and concentrated almost to dryness to give a residue of 1-[2-[p-[α-(p-methoxyphenyl) - β - nitrostyryl]phenoxy]ethyl]pyrrole. For purification, the product is triturated with cold acetone and recrystallized from acetone; M.P. 176–178° C.

Example 2

By the procedure of Example 1, with the substitution of 4.75 g. of 2,5-dimethylpyrrole for the pyrrole, the product obtained is 1-[2-[p-[α-(p-methoxyphenyl)-β-nitrostyryl]phenoxy]ethyl]-2,5 - dimethylpyrrole; M.P. 160–161° C.

Example 3

By the procedure of Example 1, with the substitution of 6.95 g. of ethylpyrrole-2-carboxylate for the pyrrole, the product obtained is ethyl 1-[2-[p-[α-(p-methoxyphenyl)-β-nitrostyryl]phenoxy]ethyl]pyrrole-2 - carboxylate; M.P. 168–170° C.

Example 4

By the procedure of Example 1, with the substitution of an equivalent amount of α-[p-(3-bromopropoxy)phenyl]-α′-nitro-4-methoxystilbene for the α-[p-(2-bromoethoxy)-phenyl]-α′-nitro-4-methoxystilbene, the product obtained is 1-[3-[p-[α-(p-methoxyphenyl)-β-nitrostyryl]phenoxy]propyl]pyrrole; M.P. 79–81° C.

Similarly, by the substitution of an equivalent amount of α-[p-(4-bromobutoxy)phenyl]-α′-nitro-4 - methoxystilbene for the α-[p-(2-bromoethoxy)phenyl]-α′-nitro-4-methoxystilbene, the product obtained, is 1 - [4-[p - [α-(p-methoxyphenyl)-β-nitrostyryl]phenoxy]butyl]pyrrole.

Example 5

By the procedure of Example 1, with the substitution of 4.05 g. of 3-methylpyrrole for the pyrrole, the product obtained is 1-[2-[p-[α-(p-methoxyphenyl)-β-nitrostyryl]phenoxy]ethyl]-3-methylpyrrole.

Example 6

With external cooling to maintain the temperature below 30° C., 0.69 g. of 90% fuming nitric acid is added dropwise to a solution of 2.05 g. of 1-[p-[2-(1-imidazolyl)-ethoxy]phenyl] - 1 - (p-methoxyphenyl)-2-phenylethanol in 25 ml. of glacial acetic acid. The resulting mixture is stirred at 30° C. for 18 hours and then poured into ice water and made strongly basic with 50% sodium hydroxide. The mixture is extracted with benzene and the benzene extract is washed with water, dried, and concentrated to give a residue of 1-[2-[p-[α-(p-methoxyphenyl) - β - nitrostyryl]phenoxy]ethyl]-imidazole; M.P. 183.5–185° C. following crystallization from ethanol.

Example 7

Following the general procedure of Example 6, 7.6 g. of 1-[p-[2-(1 - benzimidazolyl)ethoxy]phenyl]-1-(p-methoxyphenyl)-2-phenylethanol in 30 ml. of glacial acetic acid is reacted with 1.1 g. of 90% fuming nitric acid. After addition of nitric acid has been completed, the reaction mixture is then heated for 2 hours at 30° C. and for one hour at 40° C. and the product isolated as in Example 6. It is 1-[2-[p-[α-(p-methoxyphenyl)-β-nitrostyryl]phenoxy]ethyl]benzimidazole; M.P. 138–142° C.

Example 8

Following the procedure of Example 6, 32.4 g. of 1-[p-[2-[N-(2-pyridyl)anilino]ethoxy]phenyl] - 1 - (p-methoxyphenyl)-2-phenylethanol in 140 ml. of glacial acetic acid is reacted with 6.6 g. of 90% fuming nitric acid. After the addition of nitric acid has been completed, the reaction mixture is stirred at 30° C. for 18 hours and the product isolated as in Example 6. It is 2-[N-[2-[p-[α-(p - methoxyphenyl)-β-nitrostyryl]phenoxy]ethyl]anilino]pyridine; M.P. 161–162° C.

STARTING MATERIALS

Haloalkoxy benzophenones

With stirring at 50° C., 141 g. of molten 2-bromoethoxybenzene is added to 950 g. of polyphosphoric acid.

Then 111.8 g. of p-methoxybenzoic acid is added over a 10 minute period. The reaction mixture is then heated to 70° C. for one hour and to 80° C. for another hour. While hot, it is stirred for one hour with 4 liters of deionized water and then filtered. The solid product is stirred with deionized water at 60° C., cooled, collected on a filter, and stirred with another one liter portion of deionized water. The mixture is made slightly basic with 50% sodium hydroxide and the solid product is washed by decantation, collected on a filter, and dried. It is 4-(2-bromoethoxy) - 4' - methoxybenzophenone; M.P. 109–111° C. In the same manner, from 3-bromopropoxybenzene and p-methoxybenzoic acid, the product obtained is 4-(3 - bromopropoxy)-4'-methoxybenzophenone; M.P. 68–69° C. In the same manner, from 4-bromobutoxybenzene and p-methoxybenzoic acid, the product obtained is 4-(4-bromobutoxy)-4'-methoxybenzophenone.

2-phenylethanols from haloalkoxy benzophenones

A tetrahydrofuran solution of benzylmagnesium chloride (prepared from 18.4 g. of magnesium and 96.2 g. of benzyl chloride by heating at reflux for 45 minutes) is cooled to room temperature and added quickly to a solution of 232 g. of 4-(2-bromoethoxy)-4'-methoxybenzophenone and 500 ml. of tetrahydrofuran. The reaction mixture is heated at reflux for 2½ hours, cooled to 15° C., and stirred with cold saturated ammonium chloride solution. The organic phase is separated, washed with water, dried, and evaporated to give a residue of 1-[p-(2-bromoethoxy)phenyl] - 1 - (p-methoxyphenyl)-2-phenylethanol as a yellow oil. In the same manner, from 4-(4-bromobutoxy)-4'-methoxybenzophenone and benzylmagnesium chloride, the product obtained is 1-[p-(4-bromobutoxy)phenyl]-1-(p-methoxyphenyl)-2-phenylethanol.

An ethereal solution of benzylmagnesium chloride (prepared from 29.7 g. of magnesium and 140 ml. of benzyl chloride) is heated under reflux through a continuous extractor containing 387.5 g. of 4-(3-bromopropoxy)-4'-methoxybenzophenone for 96 hours or until all of the starting material has been dissolved. An equal volume of benzene is added and the reaction mixture heated under reflux for 4 more hours. The product 1-[p-(3-bromopropoxy)phenyl]-1-(p - methoxyphenyl)-2-phenylethanol, is obtained following hydrolysis of the reaction mixture with ammonium chloride solution as described above.

Stilbenes from 2-phenylethanols

A solution of 263 g. of 1-[p-(2-bromoethoxy)phenyl]-1-(p-methoxyphenyl)-2-phenylethanol and 150 ml. of acetic anhydride is heated at reflux for 4 hours and then concentrated in vacuo. The residue is dissolved in benzene and the solution is washed with aqueous sodium bicarbonate, with 1 N sodium hydroxide, and with saturated aqueous sodium chloride. It is then dried and evaporated to give the product, α-[p-(2-bromoethoxy)-phenyl]-4-methoxystilbene. α-[p-(3 - bromopropoxyphenyl]-4-methoxystilbene and α-[p-(4-bromobutoxy)phenyl]-4-methoxystilbene are prepared similarly.

α'-Nitrostilbenes from stilbenes

A solution of 230 g. of α-[p-(2-bromoethoxy)phenyl]-4-methoxystilbene in 500 ml. of glacial acetic acid at 15° C. is treated with 35.4 g. of 90% fuming nitric acid at such a rate that the temperature reaches 45° C. The resulting mixture is then stirred at room temperature for one hour and at 15° C. for one-half hour. The insoluble product, α-[p-(2-bromoethoxy)phenyl] - α' - nitro-4-methoxystilbene, is collected on a filter– M.P. 138–140° C. following crystallization from aqueous acetone. α-[p-(3-bromopropoxy)phenyl]-α'-nitro - 4 - methoxystilbene and α-[p-(4-bromobutoxy)phenyl] - α' - nitro-4-methoxystilbene are prepared similarly.

Phenoxyalkylamines

A solution of 204 g. of imidazole in 500 ml. of dimethylformamide is added to 136 g. of a 54% sodium hydride mineral oil suspension in 500 ml. of dimethylformamide at such a rate as to maintain a temperature of approximately 50° C. The mixture is stirred at 55° C. for 4 hours and then treated with a solution of 603 g. of 2-bromoethoxybenzene and 20 ml. of dimethylformamide at 75° C. The resulting mixture is stirred and heated for 6 hours at 100° C., cooled, diluted with one liter of water, and extracted with several portions of ether. The ether extract is washed with water, dried, and evaporated to give a residue of 1-(2-phenoxyethyl)imidazole; M.P. 87–88° C. following crystallization from isooctane. By substituting an equivalent amount of benzimidazole for the imidazole in this procedure, the product is 1-(2-phenoxyethyl)-benzimidazole; M.P. 90–91° C. By substituting an equivalent amount of N-(2-pyridyl)aniline for the imidazole in this procedure, the product is N-(2-phenoxyethyl)-N-(2-pyridyl)-aniline; M.P. 72.5° C.

Aminoalkoxy benzophenones

A mixture of 20 g. of 1-(2-phenoxyethyl)imidazole, 16 g. of p-methoxybenzoic acid, and 300 ml. of polyphosphoric acid is heated with stirring for one hour at 70° C. and then diluted with 4 liters of deionized water. The diluted mixture is stirred for one hour at 50° C. and the solid product is collected on a filter. This product is suspended in deionized water and the mixture is made slightly basic with 50% sodium hydroxide. The insoluble product, 4[2 - (1-imidazolyl)ethoxy] - 4' - methoxybenzophenone, is collected on a filter; M.P. 116–117° C. Similarly, from 1-(2-phenoxyethyl)benzimidazole, the product is 4-[2 - (1-benzimidazolyl) - ethoxy]-4'-methoxybenzophenone; M.P. 163–164° C. following crystallization from aqueous pyridine and from ethanol. Similarly, from N-(2-phenoxyethyl)-N-(2-pyridyl)aniline, the product is 4-[2-[N - (2 - pyridyl)anilino]ethoxy - 4' - methoxybenzophenone; M. P. 88–89° C.

2-phenylethanols from aminoalkoxy benzophenones

A solution of 12.5 g. of 4[2-(1-imidazolyl)-ethoxy]-4'-methoxybenzophenone in 75 ml. of tetrahydrofuran is slowly added to a solution of benzylmagnesium chloride prepared from 2.2 g. of magnesium and 12.5 g. of benzyl chloride in 150 ml. of tetrahydrofuran. The mixture is heated to reflux for 16 hours, cooled, and stirred with saturated ammonium chloride solution. The organic phase is separated, washed, dried, and evaporated to give a residue of 1-[p-[2-(1-imidazolyl)ethoxy]phenyl]-1-(p-methoxyphenyl)-2-phenylethanol; M.P. 164–165° C. following crystallization from cyclohexane-ethyl acetate. Similarly, from 4-[2-(1-benzimidazolyl)ethoxy]-4'-methoxybenzophenone, the product is 1-[p-[2-(1-benzimidazolyl)ethoxy]phenyl]-1-(p-methoxyphenyl) - 2 - phenylethanol. Similarly, from 4 - [2 - [N - (2-pyridyl)amino]ethoxy]-4'-methoxybenzophenone, the product is 1-[p-[2-[N - (2-pyridyl)anilino]ethoxy]phenyl] - 1 - (p-methoxyphenyl)-2-phenylethanol.

I claim:
1. A compound of the formula

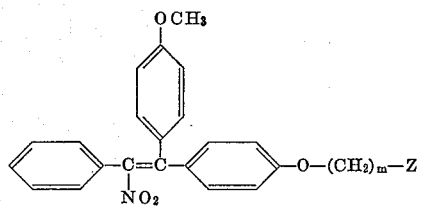

where Z is a member of the class consisting of pyrrolyl, methylpyrrolyl, and dimethylpyrrolyl, and $n$ is a positive integer from 2 to 4 inclusive.

2. A compound according to claim 1 which is 1-[2-[p-[α-(p-methoxyphenyl)-β-nitrostyryl]phenoxy]ethyl]-pyrrole.

3. A compound according to claim 1 which is 1-[3-[p-[α-(p-methoxyphenyl) - β - nitrostyryl]phenoxy]propyl]-pyrrole.

References Cited
UNITED STATES PATENTS
3,272,841  9/1966  DeWald _____ 260—326.5

ALEX MAZEL, Primary Examiner
J. A. NARCAVAGE, Assistant Examiner

U.S. Cl. X.R.
260—296, 309, 309.2, 326.3, 613, 999